(12) United States Patent
Fashant et al.

(10) Patent No.: US 7,312,866 B2
(45) Date of Patent: *Dec. 25, 2007

(54) METHODS AND SYSTEMS FOR SUBSTRATE SURFACE EVALUATION

(75) Inventors: Daniel R. Fashant, Eagan, MN (US);
Thomas A. Savard, St. Paul, MN (US);
Tracy L. Sellin, St. Paul, MN (US);
Steven P. Ecklund, St. Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 4 days.

This patent is subject to a terminal disclaimer.

(21) Appl. No.: 11/243,866

(22) Filed: Oct. 5, 2005

(65) Prior Publication Data

US 2006/0028654 A1   Feb. 9, 2006

Related U.S. Application Data

(63) Continuation of application No. 10/376,972, filed on Feb. 27, 2003, now Pat. No. 6,995,847.

(60) Provisional application No. 60/383,469, filed on May 24, 2002.

(51) Int. Cl.
*G01N 21/00* (2006.01)

(52) U.S. Cl. ............... 356/237.5; 356/625; 356/237.2; 382/286

(58) Field of Classification Search .............. None
See application file for complete search history.

(56) References Cited

U.S. PATENT DOCUMENTS 4,001,582 A   1/1977   Castaing et al.

(Continued)

FOREIGN PATENT DOCUMENTS

| DE | 36 04 142 A1 | 8/1987 |
|---|---|---|
| DE | 43 11 726 A 1 | 1/1995 |
| EP | 0 444 450 A1 | 9/1991 |
| JP | 2006126061 A * | 5/2006 |

OTHER PUBLICATIONS

English machine translation of JP 2006126061 A acquired from http://dossier1.ipdl.ncipi.go.jp/AIPN/odse_top_dn.ipdl?N0000=7400.*

(Continued)

*Primary Examiner*—Gregory J. Toatley, Jr.
*Assistant Examiner*—Juan D Valentin, II
(74) *Attorney, Agent, or Firm*—McDonnell Boehnen Hulbert & Berghoff LLP

(57) ABSTRACT

A method for determining a surface quality of a substrate sample using a differential interference contrast microscope is described. The microscope includes an eyepiece, an eyepiece focus adjustment, a microscope focus adjustment, a light source, at least one of an aperture or reticle, a camera view, a prism and an eyepiece. The method includes calibrating the focus of the eyepiece with the focus of the camera and determining a peak response ratio for the microscope through adjustment of phase between differential beams of the microscope. The substrate sample is placed under the microscope, illuminated with the light source, and brought into focus with the microscope focus. Phase between differential beams is adjusted, at least one image of the substrate sample is captured and processed to determine a level of surface structure on the substrate sample.

16 Claims, 4 Drawing Sheets

U.S. PATENT DOCUMENTS

| | | | |
|---|---|---|---|
| 4,860,224 A | | 8/1989 | Cashell et al. |
| 5,004,340 A | | 4/1991 | Tullis et al. |
| 5,317,644 A | * | 5/1994 | Kenyon et al. ............. 382/133 |
| 5,350,911 A | * | 9/1994 | Rafanelli et al. ........ 250/201.9 |
| 5,369,275 A | | 11/1994 | Usui et al. |
| 5,481,109 A | | 1/1996 | Ninomiya et al. |
| 5,796,517 A | | 8/1998 | Sensui et al. |
| 5,836,872 A | * | 11/1998 | Kenet et al. ................ 382/128 |
| 5,841,543 A | | 11/1998 | Guldi et al. |
| 5,882,938 A | | 3/1999 | Takahashi et al. |
| 5,887,077 A | | 3/1999 | Bongardt et al. |
| 5,946,543 A | | 8/1999 | Kimura et al. |
| 6,067,163 A | | 5/2000 | Guldi et al. |
| 6,128,084 A | | 10/2000 | Nanbu et al. |
| 6,164,133 A | | 12/2000 | Watanabe |
| 6,370,947 B1 | | 4/2002 | Casati et al. |
| 6,453,263 B1 | | 9/2002 | Sirtori et al. |
| 6,521,536 B1 | | 2/2003 | Robinson |
| 6,757,056 B1 | * | 6/2004 | Meeks et al. ................. 356/73 |
| 6,788,210 B1 | * | 9/2004 | Huang et al. ............... 382/154 |
| 7,019,850 B2 | * | 3/2006 | Finarov ...................... 356/630 |
| 2001/0015801 A1 | | 8/2001 | Hirose et al. |
| 2002/0001077 A1 | | 1/2002 | Casati et al. |
| 2003/0025904 A1 | | 2/2003 | Sakai et al. |
| 2003/0161038 A1 | * | 8/2003 | Tobben et al. .............. 359/386 |

OTHER PUBLICATIONS

Hartman J.S. et al: "Quantitative Surface Topography Determination by Nomarski Reflection ☐ Microscopy. 2: Microscope Modification, Calibration, and Planar Sample Experiments" ☐Applied Optics, Optical Society of America, Washington, US, vol. 19, No. 17, Sep. 1, 1980, pp. 2998-3009.

"Quantitative Surface Topography and Micro Curvature Analysis Using White Light Interference Contrast Microscopy", IBM Technical Disclosure Bulletin, IBM Corp. New York, US, vol. 38, No. 6, Jun. 1, 1995, p. 543.

* cited by examiner

METHODS AND SYSTEMS FOR SUBSTRATE SURFACE EVALUATION

CROSS REFERENCE TO RELATED APPLICATIONS

This application is a Continuation Application of application Ser. No. 10/376,972 filed Feb. 27, 2003 now U.S. Pat. No. 6,995,847, which claims priority to Provisional application Ser. No. 60/383,469 filed May 24, 2002.

BACKGROUND OF THE INVENTION

This invention relates generally to parts inspection methods and systems and, more particularly, to evaluation of highly polished substrate surfaces.

Many optical devices, such as ring laser gyroscopes, include highly polished components, such as substrates utilized in making mirrors. Operation of such devices is greatly dependent upon the quality of the mirrors. For example, super-polish quality of a substrate surface, that is, a lack of scratches and other inconsistencies in the substrate surface, is one factor that determines the amount of light scattered from a polished substrate which has been coated with a reflective material. Currently, subjective inspection techniques are utilized for inspection of polished substrates and have been found inadequate for measuring super-polished substrate surface quality and maintaining processes for producing super-polished surfaces. In one known inspection process, the resolution of the inspection is limited by an amount of operator training, operator patience, operator eyesight, as well as an optical configuration of the inspection system. As such, consistent inspection quality is difficult to achieve.

In another inspection process, the polished substrate surfaces are coated with a reflective compound and the resultant mirror products are used to evaluate the super-polish quality of the substrate. However, evaluating the super-polish process by using the coated mirror products delays feedback to the substrate polishing process and is also subject to factors external to the polishing process. Further, because the substrates are coated with the reflective compound prior to inspection, substrates with flawed surfaces may be coated which increases manufacturing costs as more costly pieces (i.e. the coated substrates) may have to be scrapped or reworked. With a better substrate inspection process, flaws in highly polished substrate surfaces could be detected, and possibly corrected, before the reflective compound is applied to a flawed polished surface substrate.

BRIEF SUMMARY OF THE INVENTION

In one aspect, a method for determining a surface quality of a substrate sample using a differential interference contrast microscope is provided. The microscope includes an eyepiece, an eyepiece focus adjustment, a microscope focus adjustment, a light source, at least one of an aperture or reticule, a camera view, a prism, a reference sample in a fixture, and differential interference optics. The method comprises calibrating the focus of the eyepiece with the focus of the camera and determining a peak response ratio (a ratio of pixel histogram central tendency location to the exposure time which maximizes the signal to noise of the surface structure data) for the microscope through adjustment of phase between differential beams through the microscope. The method further comprises placing the substrate sample under the microscope, illuminating the substrate sample with the light source, focusing on the substrate sample with the microscope focus, and adjusting a phase between differential beams to achieve a peak response ratio. At least one image of the substrate sample is captured and processed to determine a level of surface structure on the substrate sample.

In another aspect, a substrate inspection system for determining a surface quality of substrate samples is provided. The system comprises a differential interference contrast microscope that includes an eyepiece, an eyepiece focus adjustment, a microscope focus adjustment, a reticule, a prism, an objective, a camera view, an eyepiece view, and a fixture for holding a substrate sample. The system further comprises a light source, a camera, and a computer for collecting data from the camera and microscope. The microscope can be switched between the eyepiece view and the camera view and the fixture allows adjusting the slope of a substrate sample to achieve a specified peak response ratio. The computer is configured to capture at least one image of the surface slope of the substrate sample, and process images of the surface slope to determine surface quality and reconstruct an approximate surface of the substrate sample.

In still another aspect, a computer program product is used to determine a surface quality of substrate samples. The computer program product includes code for capturing at least one image of a surface slope of a substrate sample and code for processing images of the surface slope to reconstruct an approximate surface of the substrate sample.

In yet another aspect, a method for focusing a microscope on a substrate sample, the microscope having both a camera field of view and an eyepiece view is provided. The method comprises centering an edge of the substrate sample surface in the camera field of view of the microscope, focusing on the edge of the substrate sample surface using the camera field of view, switching to the eyepiece view, adjusting the eyepiece focus such that a corner of an aperture of the microscope is in focus, and testing at least one of the eyepiece focus and the camera focus by moving to an area of the substrate sample that has an identifiable structure.

DETAILED DESCRIPTION OF THE INVENTION

While the present invention is herein described in the context of a specific application wherein the invention has been found to be particularly advantageous, it will be apparent to those skilled in the art that numerous variations or modifications may be made to the exemplary embodiments without departing from the spirit and scope of the present invention. It will further be apparent that the advantages of the present invention are applicable to other applications and environments. Consequently, the exemplary embodiments described herein are set forth for illustrative purposes only and are not intended to limit practice of the invention in any aspect. The system and method are not limited to the specific embodiments described herein. Components of each system and method can be practiced independently and separately from one another. Each system and method also can be used in combination with other components and methods.

The methods and systems described herein allow a user to characterize surfaces of highly polished mirror substrates with high resolution, before they are coated with a reflective compound, and therefore create an opportunity for super polishing process optimization.

Figure 1:
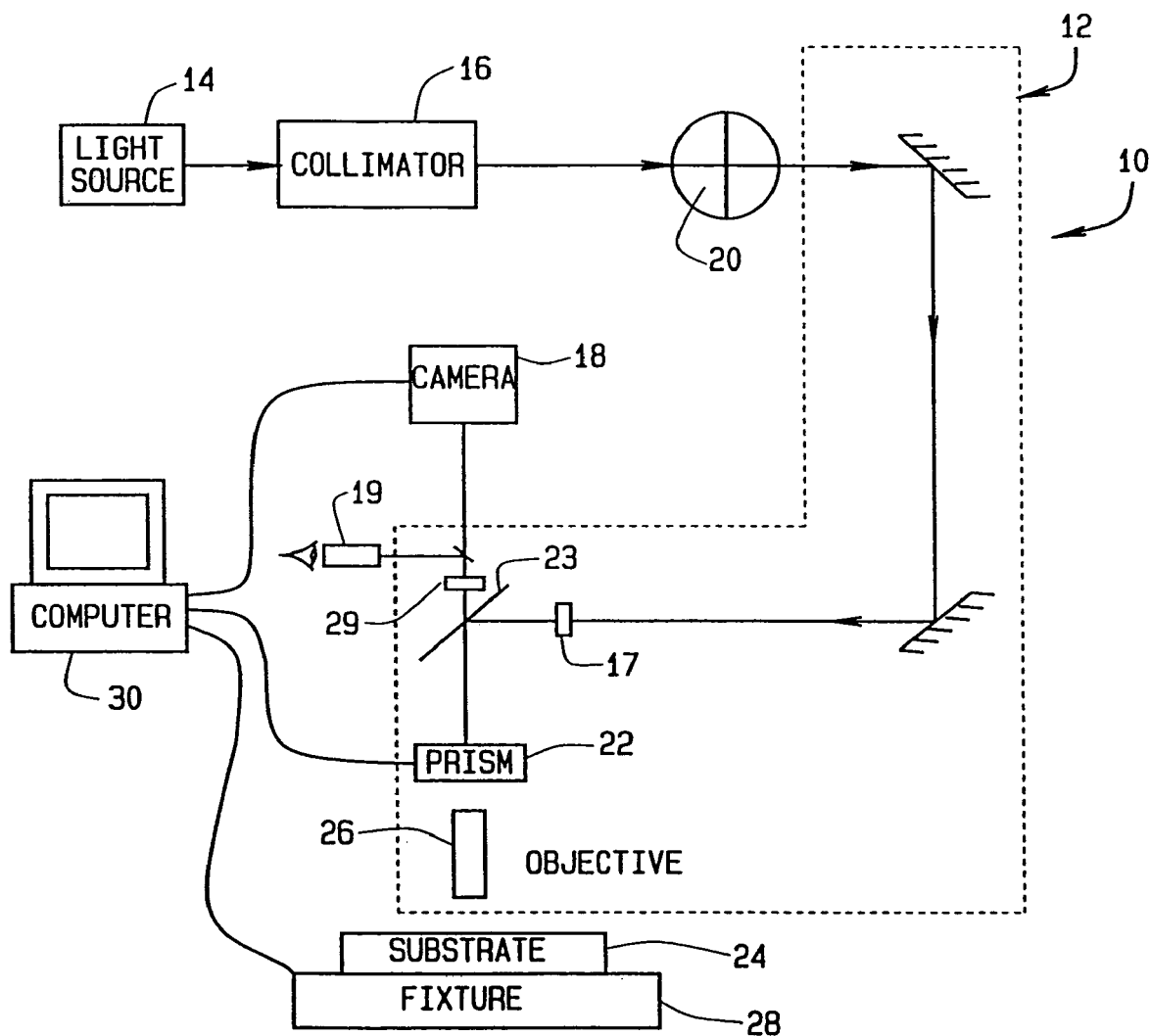
FIG. 1 is a block diagram of an inspection system for determining substrate surface quality.

FIG. 1 is a block diagram of an inspection system 10 for substrates that quantitatively measures surface quality of the substrates after a polishing process. The substrates, if found to be acceptable through the inspection process, will eventually be coated with a reflective compound. System 10 includes a differential interference contrast microscope 12 configured to measure slopes on a surface of a substrate sample 24. Slopes detected on substrate sample 24 are used to characterize polish quality on the surface of substrate sample 24. Microscope 12 utilizes a light source 14 and a collimator 16 to provide illumination of sample 24 for a low noise and high resolution charge coupled device (CCD) camera 18, which includes a light detector subdivided into a plurality of light-sensing pixels (not shown). Alternatively, an image of substrate sample 24 can be projected to an eyepiece 19, which has a focusing mechanism (not shown). In an exemplary embodiment, light source 14 is a laser light source, and collimated light from light source 14 passes through a reticle 20. Reticle 20 is located, in one embodiment, such that an optical path of light source 14 through microscope 12, through reticle 20 and onto an object, is the same length as an optical path from a user's eye to an object being magnified and from CCD camera 18 to the object being magnified. As it is desired to view the substrate samples with high bit depth resolution, CCD camera 18, in one embodiment, has 14 bits per pixel bit depth resolution. In one embodiment, CCD camera 18 is aligned so that a differential shear axis of microscope 12 is along a camera image axis.

Microscope 12 utilizes a Nomarski prism 22 to split linearly polarized incident light from light source 14 via collimator 16 and polarizer 17 into two light beams of orthogonal polarization, which are passed through an objective 26, or magnifying portion, of microscope 12. Light from light source 14 reflects off a beamsplitter 23 before entering Nomarski prism 22. When the two light beams illuminate a substrate sample 24 held in place utilizing a fixture 28, centers of the light beams are separated from each other by a small distance along a shear direction of prism 22. The separation of the beams at substrate sample 24 causes a phase difference between the two light beams wherever a surface of substrate sample 24 is not perpendicular to the optical axis of the prism 22. Upon reflection from a surface of substrate sample 24 and retransmission through prism 22, the two orthogonal polarizations are recombined into a single beam. Differences in phase that are present in a cross section of the two reflected beams result in polarization variation once the beams are recombined. By passing the combined beam through an analyzer 29, the polarization variation between the two beams is converted into an intensity variation. Intensity variation represents variations in slopes along the surface of substrate sample 24, which is one characterization method for determining polish quality for the surface of substrate sample 24.

Referring to light source 14, the narrower the bandwidth of the incident light, the greater the intensity modulation, which is typical of a differential interference process. Better collimation also increases intensity modulation. Using white light for illumination limits the intensity modulation, and therefore resolution of microscope 12 because white light is attenuated significantly during collimation. In an alternative embodiment of system 10, light source 14 is a white light source and a bandpass filter. In contrast to unfiltered white light, a 10 nm wide bandpass filter within collimator 16 can be utilized to improve the intensity modulation. In use, a 70 nm wide bandpass filter within collimator 16 provides an acceptable level of light to CCD camera 18 as well as to the operator, while also providing an acceptable intensity modulation and signal to noise ratio.

As described above, one embodiment of system 10 utilizes a laser illumination source for light source 14. The laser illumination source has an ability to increase the signal to noise ratio by orders of magnitude, since laser light has a narrow bandwidth and is collimated. When a laser illumination source is used, a rotating diffuser (not shown; in addition to collimator 16) in the optical path is utilized to minimize speckle interference patterns.

A computer 30, which includes a processor (not shown), is programmed with calibration procedures and analysis techniques to allow a user to achieve a high level of resolution when analyzing surfaces of substrate 24 for pits, scratches, and the like. While referred to as a computer, computer 30 is understood to include any and all processor or controller based machines which can implement the calibration procedures and analysis techniques. The procedures and techniques, some of which are run utilizing computer 30 include, but are not limited to, field of view compensation, focus calibration, prism calibration, microscope operation, and image processing, which are described below. By employing field of view compensation, calibration procedures and analysis techniques, system 10 is able to provide a quantitative measurement of polish quality on the surface of substrate 24. In addition, the resolution of the optical system provides feedback so that polishing processes for substrates can be improved. Further, system 10 evaluates the substrates before reflective material is applied to provide immediate feedback and to prevent reworking of substrates after the reflective material is applied.

Figure 2:
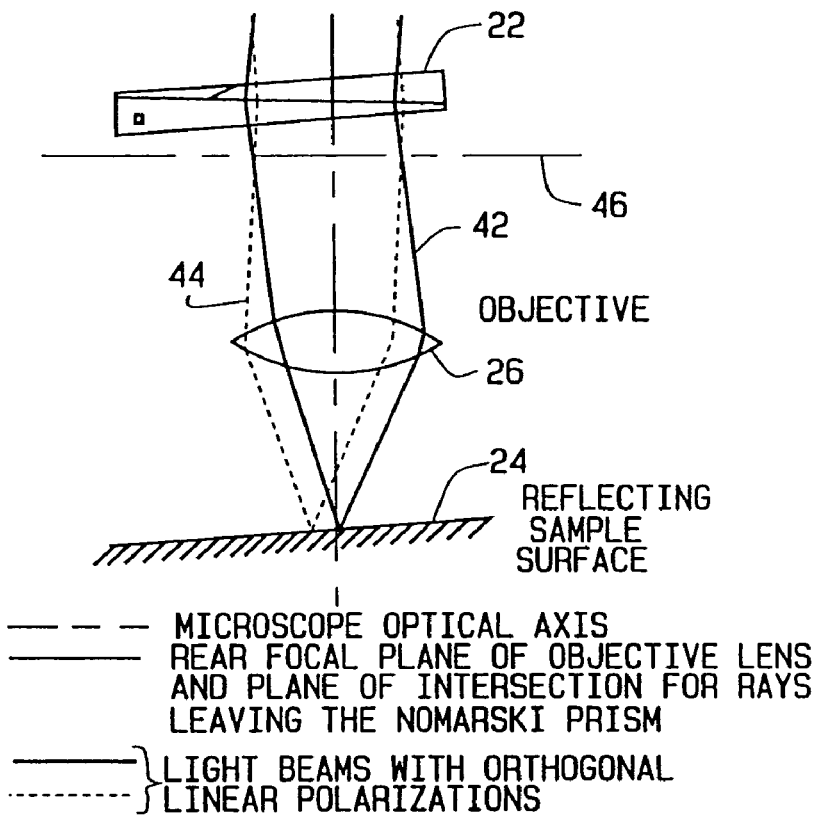
FIG. 2 is an illustration of light beams showing operation of a prism and objective of a microscope with respect to a substrate sample.

FIG. 2 is a detailed illustration of operation of Nomarski prism 22 and objective 26 with respect to substrate sample 24. Two light beams 42 and 44 are separated from one another along a shear direction of prism 22. The separation of beams 42 and 44 at substrate sample 24 causes a phase difference between the light beams wherever a surface of substrate sample 24 is not perpendicular to an optical axis 46 of prism 22. Upon reflection from a surface of substrate sample 24 and retransmission through prism 22, the two orthogonal polarizations are recombined into a single beam. Differences in phase that had been present in a cross section of the two reflected beams result in polarization variation once the beams are recombined. FIG. 2 is an illustration from the article Hartman et. al., Quantitative surface topography determination by Nomarski reflection microscopy. 2: Microscope modification, calibration, and planar sample experiments, Applied Optics, 1 Sep. 1980, Vol. 19, No 17.

Field of View Compensation

With regard to field of view compensation, incident light intensity from light source 14 varies across the field of view of microscope 12. Field of view compensation is accomplished utilizing the methods described below using a differential interference contrast system. To compensate for the variation, in one embodiment images from several different locations on a polished substrate sample of superb quality and cleanliness are collected. Such a sample is sometimes referred to herein as a reference sample. When pixel intensity values for each of the images of the reference sample are averaged, an intensity variation caused by surface imperfections on the reference sample averages to approximately zero. Therefore, any remaining variation in the resulting averaged image is considered to be a measure of an intensity variation of the incident light. The resulting image (REF) is utilized to normalize images of other substrate samples with respect to incident light intensity variation. The reference image therefore provides compensation for incident light intensity variations across the field of view and serves as a partial compensation process for utilization of microscope 12 in substrate surface quality measurement. As used herein, compensation refers to measuring a value of at least one parameter and making adjustments based on that parameter to the quantitative measurement of substrate quality, if and when such adjustments are necessary.

Focus Calibration

Focusing on a surface of substrate sample 24 is sometimes difficult since many magnified images of substrates, particularly super-polished glass, do not show an obvious structure. In one embodiment, therefore, an aperture 54 (shown in FIG. 3) is located in the incident light path of microscope 12 at the same distance as the output image distance and thus provides a mechanism for focusing. When edges of aperture 54 are in focus at eyepiece 19 after the incident beams are reflected off sample 24, sample 24 is also in focus at eyepiece 19. Typically, focus can be achieved more quickly through eyepiece 19 rather than with the camera view due to long integration times for most images. Aperture 54 is sized to be visible only through the larger field of view of eyepiece 19 in order to maximize the available field of view of camera 18. The above method is referred to as an aperture focus method.

Figure 3:
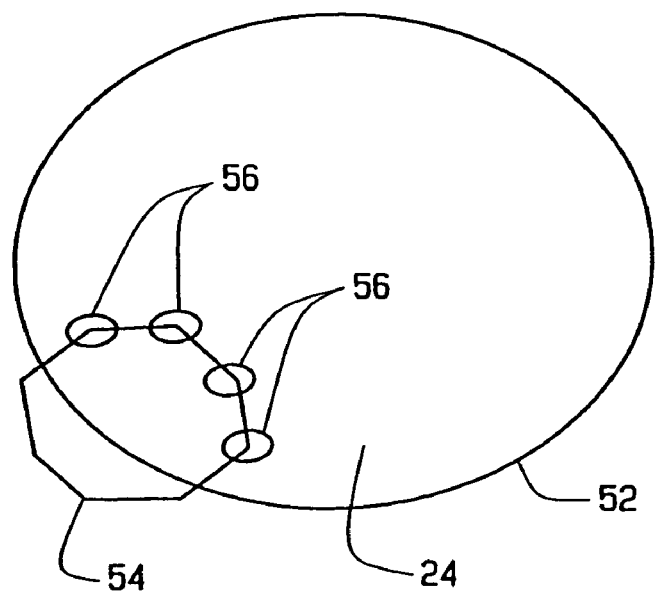
FIG. 3 is an illustration of a sample of substrate with an edge with an aperture imposed thereon.

Occasionally, the camera optical path and the eyepiece optical path are not the same. In this case, a difference between eyepiece aperture focus and camera focus must be compensated, that is, the difference between eyepiece aperture focus and camera focus must be determined and, if necessary, used to determine the best focusing for the camera field of view. In one embodiment and as shown in FIG. 3, a substrate sample 50 or another part with a thickness similar to that of substrate sample 50 is inserted into microscope 12 such that edge 52 is centered in a field of view of camera 18 (shown in FIG. 1). An eyepiece focus of microscope 12 is adjusted until at least one corner 56 of aperture 52 appears focused, then microscope 12 (shown in FIG. 1) is switched to a camera view. A fine focus knob of microscope 12 (shown in FIG. 1) is adjusted so that edge 52 is focused in the field of view of camera 18. The fine focus setting of microscope 12 is then recorded. In one embodiment, aperture 54 is moved along edge 52 of substrate 50 where the focusing process is repeated a number of times and averaged. The averaged results are recorded as an eye/camera focus offset. The above described method is sometimes referred to as an eye/camera focus offset method.

In another embodiment, one of a crosshairs, an aperture, or a screen is placed in the incident path at the image distance. When the item (i.e. the crosshairs) is in focus in the output image, substrate sample 24 under microscope 12 will also be in focus. Known image processing techniques based on edge detection are used to automatically determine the focus status.

Using curve fitting routines or low pass filtering routines within computer 30, any curvatures along the surface of substrate sample 24 may be estimated and removed from the image of the surface of substrate sample 24. After the curvature is removed from the image, the remaining intensity variation typically represents undesirable surface structure.

Spherical surfaces under microscope 12 typically follow a well defined mathematical function. If the input intensity variations have been appropriately compensated across the field of view using the technique described above, the curvature of a spherical surface may be estimated by fitting the resulting image with the following function:

$$(-Gx/[(d^2/4)-(x+r\sin(\theta-\phi))^2-(y+r\cos(\theta-\phi))^2]^{0.5})+$$
$$\beta+G\nabla_x R(x,y).$$

where:
d is a diameter of curvature of the spherical surface;
r is a distance from a center of the substrate sample;
θ is an angle between r and a forward direction of the substrate sample relative to an operator's perspective;
G is a Nomarski crystal constant obtained from calibration;
β is a Nomarski crystal background phase obtained from calibration;
(x, y) are spatial coordinates for the substrate sample relative to a shear direction of the substrate sample;
(x', y') are spatial coordinates for the substrate sample relative to an operator's perspective;
φ is an angle between the shear direction and x'; and
$\nabla_x R(x,y)$ contains a plurality of roughness slopes for the substrate sample.

Having an estimate of the curvature provides a method to inspect for flatness or a desired radius of curvature for substrate sample 24. In addition, images of substrate sample 24 are corrected for spatial variations due to surface curvature using the above-described curvature estimate. The resulting, corrected images represent the surface roughness slopes of substrate sample 24.

Prism Calibration

The intensity, I, associated with a location (x',y') on the sample and recorded with the pixel at location (x,y) on CCD camera 18 is given by:

$$I(x,y)=I_{min}(x,y)+I_{mod}(x,y)(1-\cos(Ga(x',y')+b+c)/2$$

where:
$I_{min}$ is the background intensity;
$I_{mod}$ is the modulation intensity;
G is a calibration constant for a given prism;
a is the slope of the fine surface structure;
b is the phase associated with the prism position; and
c is the phase associated with the average slope of the sample.
(topographical extension of equation in Hartman et. al., Quantitative surface topography determination by Nomarski reflection microscopy. 2: Microscope modification, calibration, and planar sample experiments, Applied Optics, 1 Sep. 1980, Vol. 19, No 17)

Typically $I_{min}$ is negligible or is removed using low pass filtering. An approximate linear response to surface slope is obtained with prism 22 in a position such that $(b+c)=\pi/2$, and the above equation can be approximated by:

$$I(x,y)=I_{mod}(x,y)(1+Ga(x',y'))/2.$$

In one method, an approximate linear response in the equation above is obtained by fixing a camera exposure time and adjusting the prism phase position b such that central tendency of the distribution of the recorded pixel values is approximately constant for each measured substrate sample image. However, this technique confounds variations in the light source intensity with prism phase position and does not adequately reduce measurement system variation for super-polished substrates.

In another embodiment, the intensity modulation as (b+c) is varied from 0 to $\pi$ and is measured prior to substrate surface quality measurements by adjusting b with prism 22 to achieve both an image intensity minimum and an image intensity maximum while illuminating a polished substrate sample of superb quality and cleanliness. The distributions of pixel intensity values are used to determine and measure minimum intensity and maximum intensity settings for prism 22. These minimum intensity and maximum intensity measurements and images captured at the intensity minimum and maximum are utilized to set a position of prism 22 and in image processing techniques which are described below. For calibration of prism 22, a position of prism is set approximately to a location which centers the distribution of pixel intensity values midway between a minimum intensity and a maximum intensity, as described above. When prism 22 is positioned in this fashion, (b+c)=$\pi/2$ and the slope of the fine surface structure is linearly proportional to the intensity and a signal to noise ratio is increased for linear detection devices, for example, CCD camera 18. The ratio of the pixel histogram central tendency location to the exposure time at the estimated phase (b+c)=$\pi/2$ determines the peak response ratio for the calibration method. This technique for calibrating prism 22 is subject to error because the maximum intensity position is not always at (b+c)=$\pi$ due to misalignment of the prism as it is translated. Consequently, this technique does not sufficiently reduce measurement system variation for the highest quality super-polished substrates.

In an alternative embodiment, the intensity modulation as (b+c) is varied from 0 to $\pi$ is measured prior to substrate surface quality measurements by adjusting c with a mechanical stage to achieve both an image intensity minimum and an image intensity maximum while illuminating a polished substrate sample of superb quality and cleanliness. Following the methods in the previous paragraph, the mechanical stage is calibrated and used to set (b+c)=$\pi/2$ for substrate measurements. In this method, the peak response ratio at phase (b+c)=$\pi/2$ is found by adjusting the mechanical stage. The mechanical method is not subject to prism misalignment error and provides the additional advantage of preserving the position of the optics throughout the calibration and measurement process.

When substrate samples 24 are placed under a microscope, substrate samples 24 rarely have a background slope which is the same as a reference image used in the prism calculation. The previously described prism calibration includes adjusting a position of prism 22 for each substrate sample 24 so that each image is recorded with the distribution of pixel intensity values approximately centered about the intensity associated with (b+c)=$\pi/2$. Adjusting prism 22 for each sample ensures a linear intensity response for surface slope variations (i.e. slope roughness) and increases a signal to noise ratio of the slope variations. However, in high-resolution substrate testing, moving prism 22 is undesirable since the movement of prism 22 creates errors in the field of view compensation. In an alternative embodiment, a position of prism 22 is fixed, and a stage is used to tilt the substrate under test, thereby varying c, until the distribution of intensity values is approximately centered around the intensity associated with (b+c)=$\pi/2$.

In another embodiment, images of a clean low quality substrate are recorded at several settings of the prism (or mechanical stage). For each picture, the camera exposure time is adjusted to achieve a specified central tendency for the distribution of pixel values. The field of view of each image is normalized by dividing each pixel value by the average intensity of local pixels. Then the standard deviation of the pixel values in each normalized image is calculated. Then, the exposure time is adjusted to the value where the standard deviation was maximized. Using this method, the peak response ratio is the ratio of the pixel histogram central tendency location to the exposure time which maximizes the standard deviation. For subsequent sample measurements, the ratio of the pixel central tendency value to the exposure should approximately equal the peak response ratio. This is accomplished by either adjusting the mechanical stage or the prism position. Different central tendencies and exposure times may be used during sample measurements, provided that the ratio of the value of the central tendency to exposure time is approximately equal to the ratio which maximized the standard deviation during calibration. The prism or stage adjustments performed in this way maximizes the image response to surface slope variations and minimizes the measurement system variation.

Figure 4:
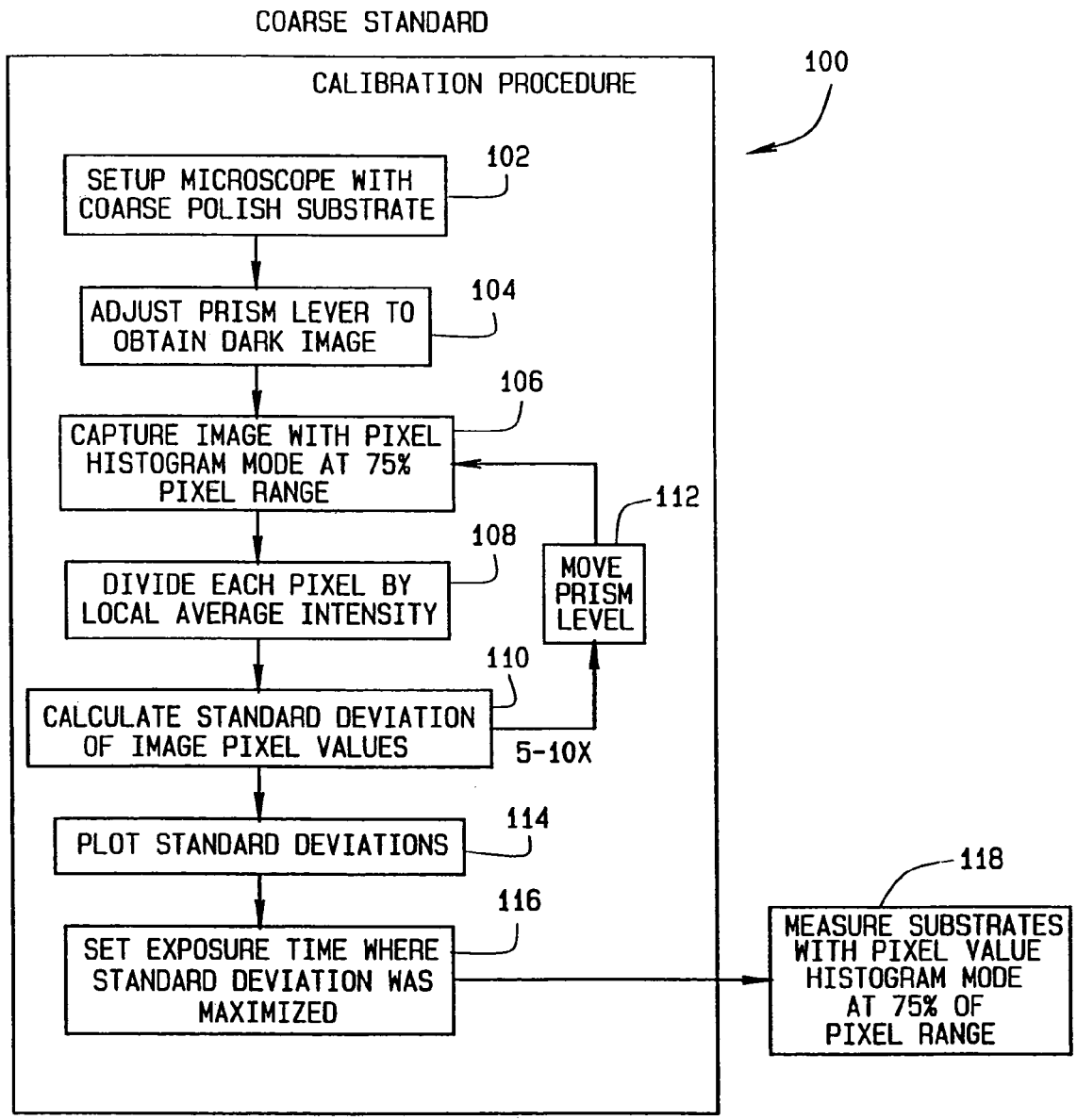
FIG. 4 is a flowchart illustrating a prism calibration method.

Referring to FIG. 4, one possible embodiment of the above described method of calibration is illustrated in flowchart 100. The method illustrated by flowchart 100 is herein referred to as a coarse standard calibration procedure. First, microscope 12 is setup 102 with a coarsely polished (low quality) substrate. Setup 102 refers to field of view compensation and focus compensation techniques, as described above, as well as standard alignment procedures associated with differential interference microscopy. Prism 22 or mechanical stage is then adjusted 104 to obtain a dark image of the substrate. An image is captured 106 with a mode of the pixel histogram at about 75% of pixel range. An intensity of each pixel is divided 108 by a local average pixel intensity. A standard deviation of image pixel intensity values is calculated 110. The method is repeated at five to ten different settings of prism 22 (shown in FIG. 1) or stage 28. A ratio of pixel histogram central tendency location to the exposure time which maximizes the signal to noise of the surface structure data is described as a peak response ratio.

The standard deviations of pixel intensity are plotted 114, and an exposure time of camera 18 (shown in FIG. 1) is set 116 to a setting that maximizes standard deviation. Substrates are then measured 118 by adjusting the prism or stage so that the mode of the histogram of pixel intensity values is at 75% of pixel range. The highest level for the mode of the histogram should be used for calibration and measurements as long as the CCD pixels are not saturated.

Operation

The above described methods are utilized to compensate for and calibrate microscope 12 for use in determining a polish quality of a number of substrate samples 24. To determine polish quality of each substrate sample 24 (shown in FIG. 3) a user first places substrate sample 24 under microscope 12. The user then focuses on substrate sample 24 using either of the above described aperture focus method or the eye/camera focus offset method.

The user is able to adjust the intensity of the image being tested via prism adjustment or stage tilt to achieve a specified mode of a histogram of pixel values. The specified histogram value is determined by the exposure time setting and the peak response ratio measured during calibration. The user then captures the image of substrate sample 24, or several images of the same position on substrate sample 24 if image averaging is to be used.

If the surface structure on substrate sample 24 is highly directional, in order to fully characterize the surface, additional images of substrate sample 24 should be acquired after rotating the substrate along the optical axis of the microscope by 90 degrees.

Figure 5:
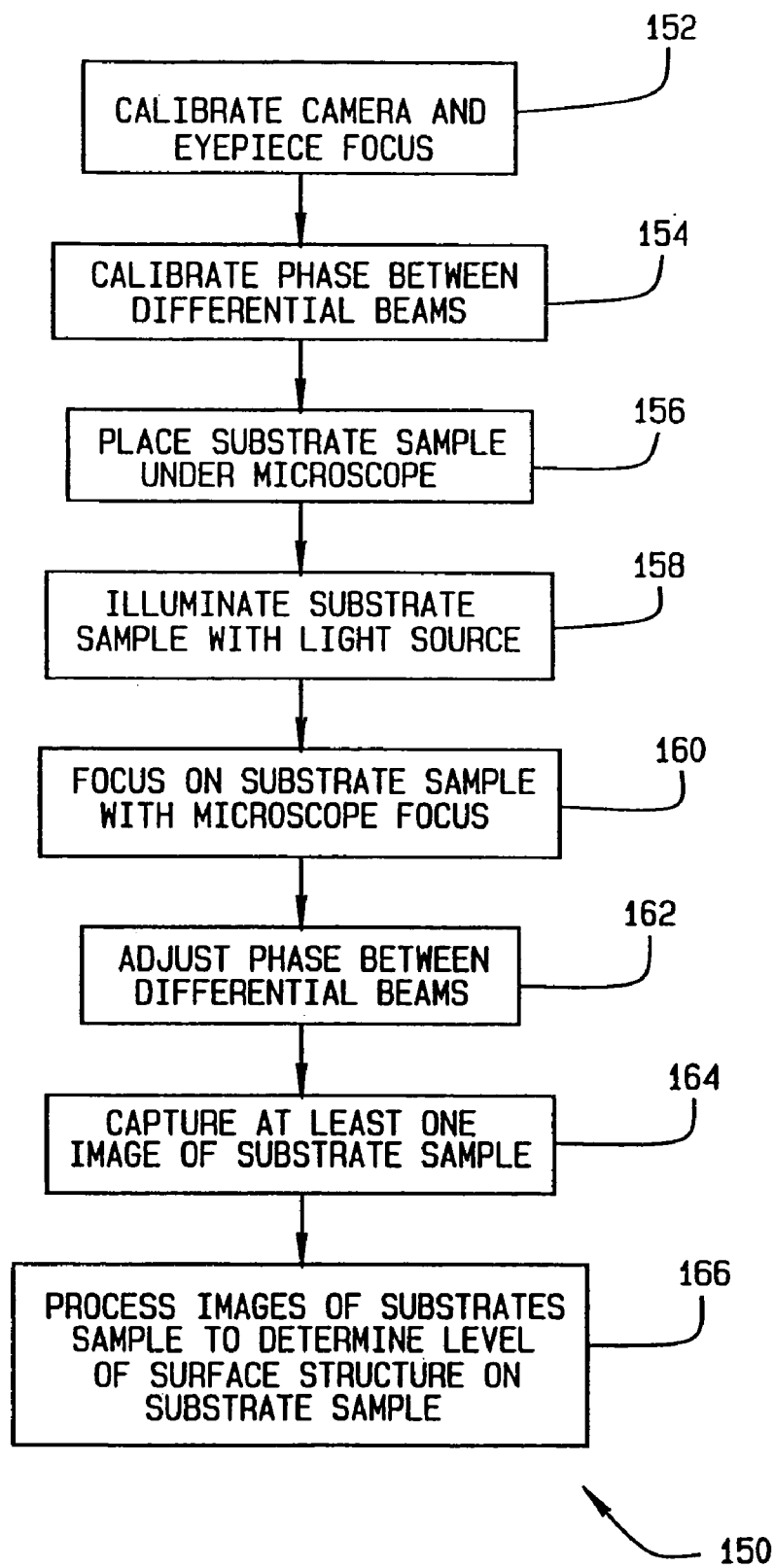
FIG. 5 is a flowchart illustrating a substrate surface quality evaluation method.

After calibration of microscope 12 as described above with respect to FIG. 4, a method for determining surface quality of substrate sample 24 is enabled, as described in detail above, and as illustrated in FIG. 5, which is a flowchart 150 for determining surface quality of substrate samples. Referring specifically to flowchart 150, focus of eyepiece 19 and camera 18 utilizing the reference sample is calibrated 152 and phase between differential beams is also calibrated 154. Substrate sample 24 is placed 156 under the microscope and illuminated 158 with light source 14. The microscope focus focuses 160 on substrate sample 24, a phase between differential beams is adjusted 162, and at least one image of substrate sample 24 is captured 164. Images of substrate sample 24 are processed 166, as further described below, to determine a level of surface structure on substrate sample 24.

Image Processing

In processing the captured images, if several images of the same location on substrate sample 24 were acquired, the images may be analyzed separately, or as an average of the images. The resulting image(s) to be analyzed is denoted as I.

Within an image I, each pixel value may be checked to determine if the value is outside of a preset limit. If so that pixel value is set to the limit, so that false effects of particulates on the surface of the substrate are reduced, and further setting of the limit improves display contrast on computer 30. In one embodiment, the limits on pixel values are +/−three standard deviations from the average, and pixel values outside of this limit are set to either + or − three standard deviations from the average, depending on the original pixel value. Pixel values less than three standard deviations below the average are set to a value equal to three standard deviations below the average. Pixel values greater than three standard deviations above the average are set to a value equal to three standard deviations above the average.

In one embodiment, captured images are compensated for variations in intensity modulation depth across the field of view. The substrate images are compensated across the field of view by dividing the substrate image I by a reference image (REF) on a pixel by pixel basis. Field of view compensation creates an image with constant response to fine slope structure across the image and enhances fine structure contrast in the displayed image. REF may be determined by several methods.

In one embodiment, REF is determined by using a reference standard as described above. Several images of different locations on a superb quality substrate are recorded at the prism or stage setting where $(b+c)=\pi/2$. The average of these images (REF) represents the input intensity variation across the field of view. Undesirable surface structure in REF is minimized by taking the average of images of several different locations on the superb quality substrate.

In an alternative embodiment, REF is generated by duplicating each substrate measurement image and applying an averaging filter (to the duplicate) which replaces each pixel by the average of nearest neighbor pixels with a certain pixel distance.

After pixel values are normalized, a two dimensional power spectral density is calculated, and displayed on computer 30. A user observes off-axis correlations in the two dimensional image to determine sleek/scratch structure versus random roughness in the substrate sample. Additionally, a one dimensional power spectral density versus spatial frequency is calculated and displayed on computer 30. The one dimensional power spectral density is integrated to determine the power in certain spatial frequency bands. Some of the spatial frequency bands in the power calculation are related to surface quality of a substrate, while others are related to camera noise and residual noise from input intensity variation across the field of view. The exact spatial frequencies depend on the application. In one embodiment, spatial frequency bands in the range of 1 $\mu m^{-1}$ to 0.1 $\mu m^{-1}$ are used to assess substrate quality, with higher values in this spatial frequency range indicating lower quality substrates and lower values indicating higher quality substrates. As used herein, the term "sleeky" refers to a substrate surface with a plurality of raised grooves that are substantially parallel to one another. As used herein the terms "sleek" and "sleek structure" refer to a plurality of raised grooves that are substantially parallel to one another as sometimes observed on a substrate surface.

In another embodiment, a one-dimensional power spectral density is calculated versus angle. The relative differences in the values of the off-axis magnitudes of the power indicate a directionality or non-directionality of the surface structure.

Correlation of x and y axes of the slope and surface images describe an amount of scratches and sleeks. In addition, Fast Fourier Transforms (FFTs) of the slope image and the topography image are used to characterize substrate sample roughness. FFTs with a high degree of x and y axis correlation (i.e. directional roughness) represent sleeky substrate surfaces, while FFTs with low correlation between x and y indicate a uniformly rough surface. The two-dimensional FFTs are integrated to give slope and surface power spectral densities as a function of frequency. Furthermore, these spectral densities are integrated over specified bandwidths of interest to simplify characterization of the substrate surfaces.

In another embodiment, an approximate three dimensional (3D) topography is determined by integrating along a shear axis of prism 22. The topography aids in classifying substrate surface structure as being one of dips, bumps, scratches, or contamination. Topography of spherical parts appears to be parabolic after the image from microscope 12 is integrated. The parabolic shape is then used to estimate curvature more accurately than the estimation from the slope image.

Algorithms are used to correctly integrate the image from microscope 12. Direct integration along the shear axis may be used, or an approximate method based on Fast Fourier Transform (FFT) techniques may be used.

The above described methods and systems therefore provide users with data which represents a quality measurement of the polishing of a surface of substrates before those sample surfaces are coated with a reflective material. Such processes are utilized to prevent substrate samples that do not have a properly polished surface from becoming coated, and then being scrapped because light scattering properties of the mirrored surface are inadequate. In addition, substrate samples 24 that do not have an adequately polished surface may be reworked, which is inefficient and costly after the reflective material has been applied.

While the invention has been described in terms of various specific embodiments, those skilled in the art will recognize that the invention can be practiced with modification within the spirit and scope of the claims.

What is claimed is:

1. A computer readable medium used to determine a surface quality of substrate samples, said computer readable medium comprising code configured to capture at least one image of a surface slope of a substrate sample and process images of the surface slope to determine a level of surface structure on the substrate sample to assess the substrate sample quality.

2. A computer readable medium according to claim 1 wherein said code is configured to:
   average samples for captured images of a substrate sample;
   calculate a power spectral density of the averaged images; and
   determine power in frequency bands of the power spectrum which are related to surface quality.

3. A computer readable medium according to claim 2 wherein to calculate a power spectral density said code is configured to:
   calculate two-dimensional power spectral densities; and
   determine sleek structure versus random roughness of the substrate sample using off-axis correlations.

4. A computer readable medium according to claim 2 wherein to calculate a power spectral density said code is configured to:
   calculate one-dimensional power spectral densities; and
   analyze densities within selected spatial frequency bands to assess substrate sample quality.

5. A computer readable medium according to claim 4 wherein to analyze densities within selected spatial frequency bands to assess substrate sample quality said code is configured to analyze densities within a selected spatial frequency band in a range of about 1 $\mu m^{-1}$ to about 0.1 $\mu m^{-1}$.

6. A method for determining a surface quality of substrate samples, said method comprising;
   capturing at least one image of a surface slope of a substrate sample;
   processing images of the surface slope; and
   determining a level of surface structure on the substrate sample to assess the quality of the substrate sample and repair the substrate sample.

7. A method according to claim 6 wherein processing images of the surface slope comprises;
   averaging samples for the captured images of the substrate sample;
   calculating a power spectral density of the averaged samples; and
   determining power in frequency bands of a power spectrum, the frequency bands being related to surface quality.

8. A method according to claim 7 wherein calculating a power spectral density comprises:
   calculating two-dimensional power spectral densities; and
   determining sleek structure versus random roughness of the substrate sample using off-axis correlations.

9. A method according to claim 7 wherein calculating a power spectral density comprises:
   calculating one-dimensional power spectral densities; and
   analyzing densities within selected spatial frequency bands to assess substrate sample quality.

10. A method according to claim 9 wherein analyzing densities within selected spatial frequency bands comprises analyzing densities within a selected spatial frequency band in a range of about 1 $\mu m^{-1}$ to about 0.1 $\mu m^{-1}$.

11. A method according to claim 6 wherein capturing at least one image of a surface slope of a substrate sample comprises:
    calibrating a microscope eyepiece focus with a focus of a camera that captures the images; and
    determining a peak response ratio for the microscope through adjustment of phase between differential beams of the microscope.

12. A method according to claim 11 wherein calibrating the microscope eyepiece focus with the camera focus comprises placing an edge of a reference sample in the field of view of the camera.

13. A method according to claim 6 wherein capturing at least one image of a surface slope of a substrate sample comprises adjusting a phase between differential beams to attain the peak response ratio.

14. A method according to claim 13 wherein adjusting a phase between differential beams comprises:
    adjusting to a plurality of positions at least one of a prism and a slope of the reference sample;
    determining which position provides a best structure contrast; and
    determining a peak response ratio which is the ratio of the central tendency of pixel values to The exposure time.

15. A method according to claim 6 wherein capturing at least one image of a surface slope of a substrate sample comprises capturing at least one image of the substrate sample in at least two orientations.

16. A method according to claim 6 further comprising adjusting a position of at least one of microscope prism and a slope of the substrate sample to a position such that a ratio of a central tendency of pixel values to exposure time is approximately equal to the peak response ratio.

* * * * *